United States Patent
Ebuchi et al.

(10) Patent No.: US 9,145,930 B2
(45) Date of Patent: Sep. 29, 2015

(54) ELECTROMAGNETIC ENGAGEMENT APPARATUS

(75) Inventors: Hiroaki Ebuchi, Hadano (JP); Hideaki Komada, Gotenba (JP); Hirotatsu Kitabatake, Susono (JP); Hiroto Hashimoto, Susono (JP); Minoru Onitake, Kariya (JP); Kenji Korenaga, Anjo (JP)

(73) Assignees: TOYOTA JIDOSHA KABUSHIKI KAISHA, Toyota-shi (JP); JTEKT Corporation, Osaka-shi (JP)

( * ) Notice: Subject to any disclaimer, the term of this patent is extended or adjusted under 35 U.S.C. 154(b) by 350 days.

(21) Appl. No.: 13/534,532

(22) Filed: Jun. 27, 2012

(65) Prior Publication Data

US 2013/0001036 A1 Jan. 3, 2013

(30) Foreign Application Priority Data

Jun. 28, 2011 (JP) ................................ 2011-142898

(51) Int. Cl.
*F16D 27/06* (2006.01)
*F16D 27/112* (2006.01)
*F16D 27/00* (2006.01)

(52) U.S. Cl.
CPC ............ *F16D 27/112* (2013.01); *F16D 27/004* (2013.01)

(58) Field of Classification Search
CPC .... F16D 27/004; F16D 27/115; F16D 27/112
USPC ................. 192/84.7, 35, 54.5, 53.2
See application file for complete search history.

(56) References Cited

U.S. PATENT DOCUMENTS

| 3,000,479 | A  | * | 9/1961  | Mosbacher ...................... 192/35 |
| 4,352,415 | A  | * | 10/1982 | Powell ........................... 188/156 |
| 5,505,285 | A  | * | 4/1996  | Organek .......................... 192/35 |
| 6,935,475 | B2 | * | 8/2005  | Weilant ........................... 192/35 |
| 2002/0033311 | A1 | * | 3/2002  | Yamamoto et al. ............. 192/35 |
| 2004/0188212 | A1 |   | 9/2004  | Weilant |

FOREIGN PATENT DOCUMENTS

| JP | 5-62747       | 8/1993 |
| JP | 11-51089      | 2/1999 |
| JP | 2011-047424 A | 3/2011 |
| JP | 2011-122679 A | 6/2011 |
| JP | 2011-122680 A | 6/2011 |

* cited by examiner

*Primary Examiner* — Rodney H Bonck
*Assistant Examiner* — Stacey Fluhart
(74) *Attorney, Agent, or Firm* — Oblon, McClelland, Maier & Neustadt, L.L.P.

(57) ABSTRACT

An apparatus includes: a cam that has two cam members disposed facing each other and produces thrust in an axis direction; an attracting member that creates friction force by attracting the cam members into contact with the attracting member by magnetic attraction force; an attracted member that is attached to one cam member of the two so as to rotate integrally together with the one cam member and be relatively movable in the axis direction, and that is attracted by the attracting member into contact with the attracting member so that the friction force is produced; a first return spring that exerts elastic force on the attracted member so as to move the attracted member away from the attracting member against the magnetic attractive force; and a second return spring that exerts elastic force on the one cam member.

5 Claims, 5 Drawing Sheets

ELECTROMAGNETIC ENGAGEMENT APPARATUS

INCORPORATION BY REFERENCE

The disclosure of Japanese Patent Application No. 2011-142898 filed on Jun. 28, 2011 including the specification, drawings and abstract is incorporated herein by reference in its entirety.

BACKGROUND OF THE INVENTION

1. Field of the Invention

The invention relates to an electromagnetic engagement apparatus that engages by producing a thrust based on attractive force by electromagnetism and on differential rotation.

2. Description of the Related Art

In a power transmission system of a vehicle, a clutch apparatus that permits and prevents the transfer of rotation and power of an engine is provided between the engine and a manual transmission. There are various types of clutch apparatuses; for example, a dog clutch, a friction clutch, a fluid clutch, an electromagnetic clutch, etc. are known. Among these, the electromagnetic clutch apparatus permits and prevents the power transfer by using electromagnetic force. Electromagnetic clutch apparatuses can be divided into a pressure engagement type, a dog type, a gap type that uses iron powder as a medium, etc., according to the structure that transmits torque.

For example, Japanese Utility Model Application Publication No. 5-62747 (JP 5-62747 U) describes an electromagnetic brake in which divided armatures that are magnetically attracted by electromagnetic force are employed and each armature is equipped with a braking spring. JP 5-62747 U also describes that the spring force of the braking spring that provides spring force to the first armature to be magnetically attracted or drawn is smaller than the spring force of any other braking springs.

Besides, Japanese Patent Application Publication No. 11-51089 (JP 11-51089 A) describes an electromagnetic clutch that has an armature stack formed by two divided layers, and also has a pressing spring that exerts spring force on the armature, and a buffer member disposed between the layers of the armature stack.

However, in the structures described in JP 5-72747 U and JP 11-51089 A, two armatures that are radially outer and inner armatures are provided, and return springs are provided individually for each armature, and each armature is attracted by electromagnetic force. Therefore, in the construction described in JP 5-62747 U, the electromagnetic force for releasing the clutch needs to be greater than or equal to the elastic force of the aforementioned return springs, and large current must be passed through in order to release the clutch; thus, there is room for betterment in terms of improving energy efficiency.

SUMMARY OF THE INVENTION

This invention has been accomplished in light of the foregoing technical problem, and provides an electromagnetic engagement apparatus capable of improving energy efficiency by reducing the electromagnetic force that is needed in order to set the engaged state or the released state.

According to one aspect of the invention, there is provided an electromagnetic engagement apparatus that has the following component elements. That is:

a cam mechanism that has a pair of cam members disposed facing each other in an axis direction, and that produces thrust in the axis direction according to torque difference between the cam members if the torque difference occurs so as to rotate the cam members in directions opposite to each other;

an attracting member that creates the torque difference by friction force that is produced by attracting at least one of the cam members into contact with the attracting member by magnetic attraction force;

an attracted member that is attached to one cam member of the cam members so as to rotate integrally together with the one cam member and be relatively movable in the axis direction, and that is attracted by the attracting member into contact with the attracting member so that the friction force is produced;

a first return spring that exerts elastic force on the attracted member in such a direction as to move the attracted member away from the attracting member against the magnetic attractive force; and a second return spring that exerts elastic force on the one cam member in such a direction as to move the one cam member away from the attracting member against the thrust, wherein the electromagnetic engagement apparatus is configured to increase engagement force that unites the cam members together by increasing the torque difference by using the thrust that presses the one cam member to an attracting member side.

In the above-described electromagnetic engagement apparatus, the attracting member may include a yoke and an electromagnetic coil disposed within the yoke.

Besides, in the electromagnetic engagement apparatus, the elastic force of the second return spring may be greater than the elastic force of the first return spring. Furthermore, in the electromagnetic engagement apparatus, dimensions and specifications of the electromagnetic engagement apparatus may be set such as to allow establishment of a first engaged state in which the attracting member and the attracted member are frictionally engaged with each other but the cam member and the attracting member are not engaged with each other, a second engaged state in which the attracting member and the attracted member are frictionally engaged with each other and the attracted member and the one cam member contact and are engaged with each other, and a non-engaged state in which the attracting member is neither engaged with the attracted member nor the one cam member.

Still further, in the electromagnetic engagement apparatus, electric current that is passed through the electromagnetic coil may be controlled so as to control torque until the one cam member is engaged, and at least one of cam angles of the two cam members, a friction coefficient of each of cam surfaces of the two cam members, and a diameter of disposal of a rolling body interposed between the two cam members may be set such that the cam mechanism enters a self-locked state when the one cam member is engaged.

Besides, in the electromagnetic engagement apparatus, the attracted member may be disposed between the cam member and the attracting member, and may be configured so that due to the thrust, the one cam member clamps the attracted member by working together with the attracting member.

According to the invention, the structure of the electromagnetic engagement apparatus can be simplified, and since the attracted member and a movable cam member, that is, one of the aforementioned cam members, are provided with elastic forces from the different return springs, release from the engaged state can be easily accomplished by reducing the current supplied. Besides, since the magnetic attractive force by which the attracting member magnetically draws the attracted member toward itself needs only to surpass the elastic force of the first return spring, the electric power consumed at the time of magnetically drawing the attracted member can be reduced. Furthermore, the torque capacity can be controlled by controlling the amount of electric current supplied. Besides, utilizing the elastic force of the second return spring, it is possible to move the movable cam member away, and to leave pressing force to the movable cam member.

According to the invention, it suffices that the elastic forces of the return springs are set so as to be different in magnitude from each other, so that the structure of the electromagnetic engagement apparatus can be simplified. Since the elastic force of the first return spring is relatively small, the electric power consumption at the time of magnetic attraction can be further reduced, so that the occurrence of excessively large torque during the initial period of engagement can be restrained. Since the elastic force of the second return spring is relatively large, the release from the engaged state can be more easily accomplished by reduction in the current. Besides, the impulsive load on the friction surface can be reduced, so that it becomes possible to improve the endurance of the electromagnetic engagement and to maintain the friction coefficients of the friction surfaces. Furthermore, the axial movement of the movable cam member caused by input of angular acceleration can be prevented, and therefore risk can be reduced. It becomes possible to design the attracted member to be lighter in weight than in the related art and include it in the construction of the invention. Even in the case where due to input of vibration to the attracted member, the attracted member is axially move to the yoke side, the large elastic force of the second return spring prevents the movable cam member from axially moving. Therefore, even if the attracted member collides with the yoke, the torque capacity can be limited only to a very short time.

Besides, according to the invention, due to the self-locking of the electromagnetic engagement apparatus, an engaged state independent of electric current can be maintained, and the electric power consumption can be reduced. Besides, while the electromagnetic engagement apparatus has a self-lock construction, the apparatus also has a region in which the torque capacity can be controlled by electric current, so that the operation of the apparatus can also be controlled through control of current.

Besides, according to invention, the engaged states of the electromagnetic engagement apparatus include two different engaged states, that is, an engaged state in which the attracting member and the attracted member are in friction engagement with each other, and an engaged state in which the cam member is engaged with the attracting member via the attracted member, and the electromagnetic engagement apparatus can be engaged into and released from either one of the two engaged states. Besides, the impact during an early period of the engagement can be reduced, and the control of torque capacity becomes easy.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
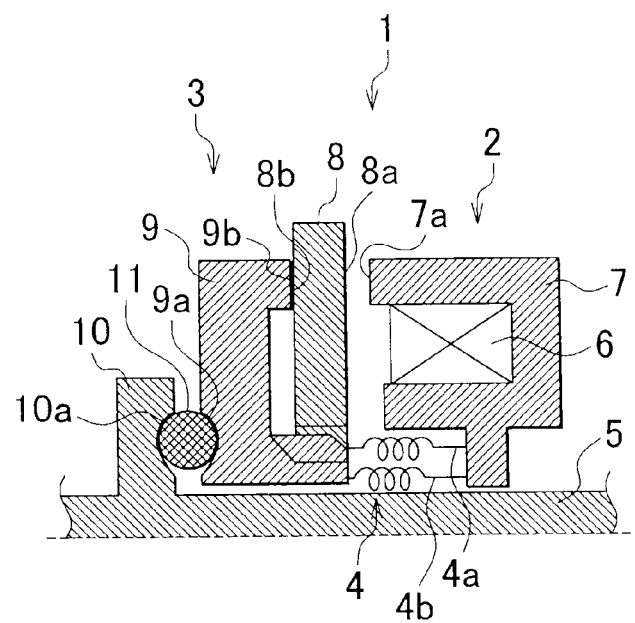
FIG. 1 is a sectional view schematically showing a released state of an electromagnetic engagement apparatus in accordance with an example embodiment of the invention.

Hereinafter, an electromagnetic engagement apparatus in accordance with an embodiment of the invention will be described with reference to the accompanying drawings. FIG. 1 is a diagram schematically showing a sectional view of a released state of an electromagnetic engagement apparatus 1 in accordance with the embodiment. The electromagnetic engagement apparatus 1 shown in FIG. 1 includes: an actuator 2 that produces electromagnetic attractive force by electromagnetism; a cam mechanism 3 that produces thrust in the direction of an axis due to torques acting on a pair of cam members in opposite directions, that is, due to occurrence of a torque difference between the two cam members; and return springs 4 that are provided between the actuator 2 and the cam mechanism 3 and that provides elastic force to the cam mechanism 3.

The actuator 2 has an electromagnetic coil 6 that produces magnetic flux when the electromagnetic coil 6 is supplied with electric current, that is, energized, and a yoke 7 that houses the electromagnetic coil 6. The yoke 7 magnetically attracts an armature 8 that forms a portion of the cam mechanism 3 so that the yoke 7 contacts the armature 8 and produces friction force. The yoke 7 is disposed at an outer peripheral side of a rotation shaft 5, and is fixed to a fixture member such as a transmission casing (not shown) or the like. The yoke 7 has an annular shape as a whole, and a section of a peripheral portion of the yoke 7 has a square U shape that is open in the direction of the axis. The electromagnetic coil 6 is fitted in a space defined in the aforementioned U sectional shape of the yoke 7. The yoke 7 is disposed facing the armature 8, and has a friction surface 7a that frictionally engages with the armature 8. The friction surface 7a of the yoke 7 has a ring shape or a square frame shape. Furthermore, the yoke 7 is constructed with a magnetic characteristic of a ferromagnetic substance and also with improvements in the strength against impact and friction, the durability, etc.

The cam mechanism 3 is constructed of a rotary disc 10 that is a first cam member united together with the rotation shaft 5, a second cam member that is disposed coaxially with the rotary disc 10 and that is rotatable relative to the rotation shaft 5 and is also movable in the axis direction, and spherical cam balls 11 each of which is a rolling body interposed between the rotary disc 10 and the second cam member. The second cam member is divided into two members that are movable relative to each other in the axis direction, and that are a movable cam member 9 that is a first movable cam member that is disposed facing the rotary disc 10 and that holds the cam balls 11 against the rotary disc 10, and the armature 8 that is a second movable cam member that is disposed facing the yoke 7 and that is attracted by the magnetic attractive force of the yoke 7. Therefore, the cam mechanism 3 rotates together with the rotation shaft 5. Instead of the foregoing concept that the cam mechanism 3 is constructed of the rotary disc 10, the second cam member made up of the movable cam member 9 that is a first movable cam member and the armature 8 that is a second movable cam member, and the cam balls 11 that are rolling bodies, it is also permissive to adopt a concept that the cam mechanism 3 is constructed of the rotary disc 10 that has a cam surface 10*a*, the movable cam member 9 that has a cam surface 9*a* and the cam balls 11 each of which is a rolling body, and that the armature 8 having no cam surface is considered not to belong to the cam mechanism 3. In the description of the embodiment below, the former concept is assumed as a basis for description.

The cam mechanism 3 is disposed at the outer peripheral side of the rotation shaft 5, and, in the axis direction, the armature 8 and the movable cam member 9 that constitute the second cam member is disposed between the rotary disc 10 that is the first cam member, and the yoke 7 that constitutes the actuator 2. Besides, in the axis direction, the armature 8 is disposed between the yoke 7 and the movable cam member 9. Furthermore, a portion of the movable cam member 9 is also disposed facing the yoke 7.

The armature 8 is a rotating member that is magnetized and is magnetically drawn toward the yoke 7 when the electromagnetic coil 6 is electrically energized to produce magnetic flux, and that is then magnetically stuck to the yoke 7 so as to frictionally engage with the yoke 7 when coming into contact with the yoke 7. As for the armature 8, as exemplified in FIG. 1, a flat platy portion whose sectional shape has a shape that corresponds to the sectional shape of a flat plate is disposed between the yoke 7 and the movable cam member 9, and an inner periphery-side portion of the armature 8 is linked to the movable cam member 9 so as to be movable in the axis direction relative to the movable cam member 9. For example, the inner periphery-side portion of the armature 8 is provided with a link portion that is spline-fitted to the movable cam member 9. In other words, the flat platy portion extends radially outward, that is, toward the outer periphery side, from a portion of the link portion in the axis direction. Between the armature and the yoke 7, a first return spring 4*a* is disposed. A construction is made such that the elastic force of the first return spring 4*a* is exerted on a site in the radial direction in or near the link portion which faces the yoke 7. Besides, on a face of the flat platy portion that faces the yoke 7, there is formed a friction surface 8*a* that frictionally engages with the yoke 7 to produce friction force, and on a face thereof that faces the movable cam member 9, there is formed a pressed surface 8*b* that contacts the movable cam member 9 and is pressed by the movable cam member 9. Besides, the armature 8 is formed from a magnetic material that has a magnetic characteristic of a ferromagnetic substance.

The movable cam member 9 is a member that is moved in the axis direction by the thrust in the axis direction based on the torque that acts so that differential rotation occurs between the movable cam member 9 and the rotary disc 10, and that presses the armature 8 and engages with the yoke 7 with the armature 8 clamped therebetween. The movable cam member 9 is an annular rotary member, and a section thereof has a generally U shape as illustrated in FIG. 1. Besides, the movable cam member 9 is linked with the armature 8 so as to be movable in the axis direction relative to the armature 8. For example, on an inner periphery-side portion of a protrusion in the axis direction that is provided at an inner periphery-side portion of the movable cam member 9, there is formed a boss portion. The armature 8 is spline-fitted to the boss portion. A construction is made such that the elastic force of the second return spring 4*b* is exerted at a site where the protrusion and the yoke 7 face each other. Besides, on a protrusion in the axis direction that is provided in an outer periphery-side portion of the movable cam member 9, there is formed a pressing surface 9*b* that faces the armature 8 and that presses the armature 8 to the yoke 7 side when in contact with the armature 8. Furthermore, on a surface of the movable cam member 9 which faces the rotary disc 10, there is formed a cam surface 9*a* described later. The cam surface 9*a* and the rotary disc 10 clamp and thus hold the cam balls 11. Incidentally, the movable cam member 9 is not attracted by magnetic attractive force, and is therefore not moved to the yoke 7 side by the actuator 2.

Figure 4:
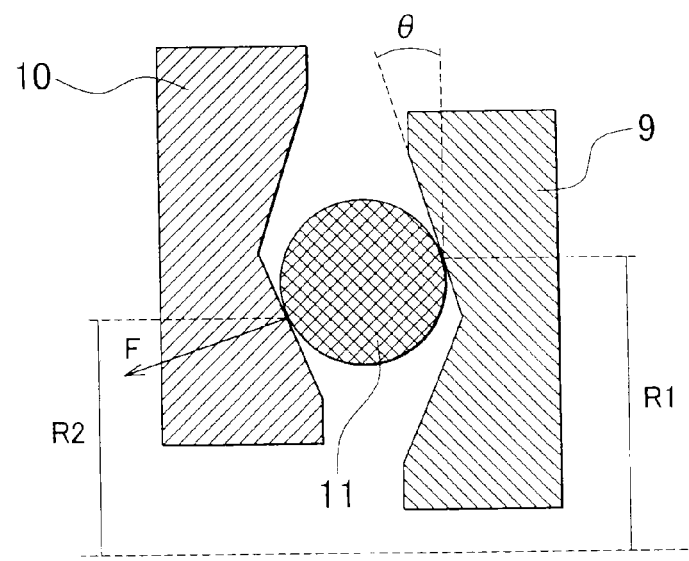
FIG. 4 is a sectional view of a cam surface of a cam mechanism in the embodiment viewed from a radial direction.

Besides, the surfaces of the movable cam member 9 and the rotary disc 10 which face each other across the cam balls 11 have cam surfaces 9*a* and 10*a*, respectively, as groove portions for holding the cam balls 11. As exemplified in FIG. 4, the cam surfaces 9*a* and 10*a* are each inclined as in a V shape in a view taken in the radial direction. The cam mechanism 3 has a construction that includes the rotary disc 10 at the side of input from the rotation shaft 5, the armature 8 that produces friction force, the movable cam member 9 provided at the side of input from the armature 8, and the cam balls 11. The cam mechanism 3 produces a torque cam reaction force due to the torque difference produced, and produces the pressing thrust based on the torque cam reaction force. Besides, the thrust produced by the cam mechanism 3 acts as engagement force that unites the components of the cam mechanism 3 together, and is capable of setting the presence or absence of a self-lock function of forming a locked state in a self-binding fashion by using the engagement force. For example, various parameters related herein include a friction coefficient of each cam surfaces (i.e., the friction coefficients between the cam surface 9*a* of the movable cam member 9 and the cam balls 11 and between the cam surface 10*a* of the rotary disc 10 and the cam balls 11), the diameter of disposal of the cam balls 11 (i.e., the distance from the rotation center axis of the electromagnetic engagement apparatus to the center of each cam ball), the effective radius of a friction surface of the rotary disc 10, cam angles θ of the cam surfaces 9*a* and 10*a* of the cam members, etc. Incidentally, cam operation force F is indicated in FIG. 4. This cam mechanism 3 has a self-lock function of establishing a locked state in a self-binding fashion if the aforementioned parameters are set to predetermined values so that a lock establishment condition is set, and a non-self-lock function of not establishing the locked state in the self-binding fashion if the parameters are set to predetermined values so that a non-establishment-of-lock condition is set.

The return springs 4 are disposed between the yoke 7 and portions of the armature 8 and the movable cam member 9 which face the yoke 7. Therefore, two return springs 4 are provided. The return springs 4 include a first return spring 4*a* that is disposed between the armature 8 and the yoke 7 and that exerts elastic force on the armature 8 in a direction away from the yoke 7, and a second return spring 4*b* that is disposed between the movable cam member 9 and the yoke 7 and that exerts elastic force on the movable cam member 9 in a direction away from the yoke 7. As exemplified in FIG. 1, in the released state, the armature 8 and the yoke 7 are apart from each other, and the movable cam member 9 and the yoke 7 are apart from each other. Besides, the return springs 4 are each provided via a thrust bearing (not shown) that is attached to one of the yoke 7 and the second cam member. Furthermore, setting is made such that the elastic forces of the return springs 4a and 4b are different in magnitude from each other. In the electromagnetic engagement apparatus 1 in accordance with the embodiment, the elastic force of the first return spring 4a is set smaller than the elastic force of the second return spring 4b.

Next, engaging actions and releasing actions of the electromagnetic engagement apparatus 1 will be described. In the state where the electromagnetic coil 6 of the actuator 2 is not electrically energized, the armature 8 and the movable cam member 9 are apart from the yoke 7 due to the elastic force exerted on the armature 8 by the first return spring 4a and the elastic force exerted on the movable cam member 9 by the second return spring 4b. This released state is a state in which, as shown in FIG. 1, the armature 8 and the yoke 7 are not in contact with each other and the pressed surface 8b of the armature 8 and the pressing surface 9b of the movable cam 9 are in contact with each other. When electric current is passed through the electromagnetic coil 6 during the released state, the electromagnetic coil 6 produces magnetic flux, and the armature 8 is magnetized by electromagnetism, and therefore receives magnetic force by which the armature 8 is magnetically attracted to the yoke 7 side. When the magnetic attractive force exerted on the armature 8 to the yoke 7 side surpasses the elastic force that urges the first return spring 4a in the direction away from the yoke 7 side, the armature 8 moves in the axis direction to the yoke side 7, overcoming the elastic force.

Figure 2:
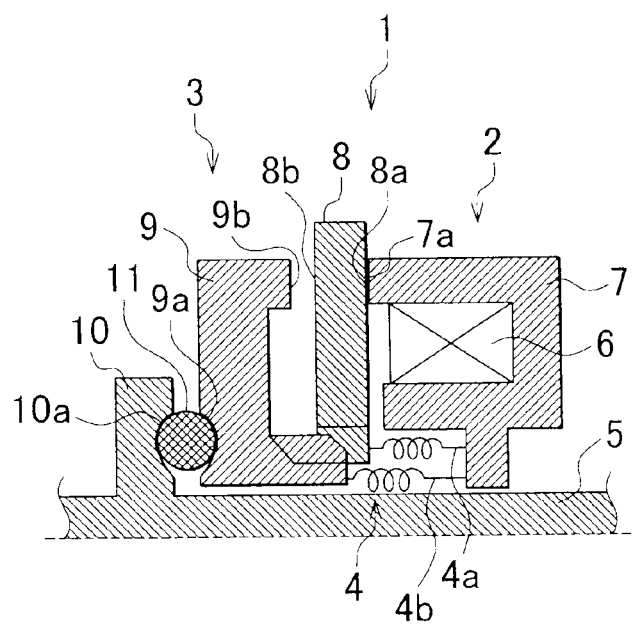
FIG. 2 is a sectional view showing a first engaged state of the electromagnetic engagement apparatus of the embodiment.

The armature 8, magnetically attracted to move to the yoke 7 side, comes into contact with the yoke 7 and frictionally engages with it, so that friction force is created and friction torque is produced. This engaged state is a state as exemplified in FIG. 2 in which the armature 8 and the yoke 7 are in frictional engagement with each other but the movable cam member 9 and the yoke 7 are not in engagement with each other. This engaged state is termed the first engaged state. In the first engaged state, the armature 8 is in frictional engagement with the yoke 7 due to the magnetic attraction force caused by the actuator 2. Therefore, as long as the electromagnetic coil 6 is being electrically energized so that the magnetic attraction force produced thereby is stronger than the elastic force of the first return spring 4a, the first engaged state is maintained. When the elastic force surpasses the magnetic attraction force, the first engaged state ceases and changes into the released state. Besides, during an initial period of the engagement in the first engaged state, that is, when the armature 8 and the yoke 7 come into contact, an engaged state in which the yoke 7 stops the rotation of the armature 8 is not instantaneously reached, but the armature 8 rotates relative to the yoke 7 and has a sliding contact therewith. Incidentally, in the electromagnetic engagement apparatus 1 of this embodiment, while the yoke 7 and the armature 8 that is rotating have relative rotation and are in friction engagement with each other, the friction between the friction surface 8a of the armature 8 and the friction surface 7a of the yoke 7 creates friction force, which causes production of friction torque.

This friction torque is a brake torque that provides the armature 8 with braking force and that therefore provides the rotation shaft 5 with braking force. The friction torque during the first engaged state is termed the brake torque Tb1. The brake torque Tb1 is expressed by a relation of "Tb1=μ×r×Fm" where Fm is the magnetic attraction force, μ is the friction coefficient of the friction surfaces, and r is the friction radius. Therefore, if the quantity of current passed through the electromagnetic coil 6 is increased, the magnetic attractive force Fm increases, and therefore the torque capacity of the brake torque Tb1 increases. In this relation, the torque capacity of the brake torque Tb1 increases in proportion to increases in the energizing current during the first engaged state as exemplified in FIG. 5.

Figure 3:
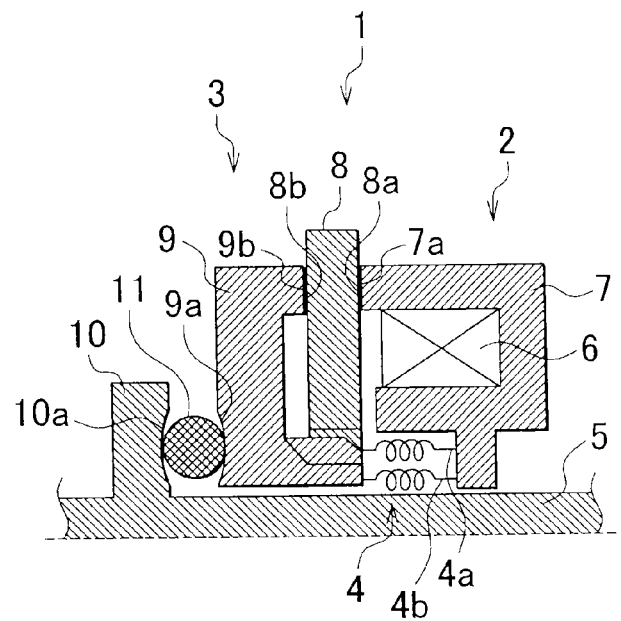
FIG. 3 is a sectional view schematically showing a second engaged state of the electromagnetic engagement apparatus of the embodiment.

If during the first engaged state, the brake torque Tb1, which is friction torque, is produced, the cam mechanism 3 operates due to the differential rotation resulting from the friction torque. This differential rotation occurs when there occurs such a torque difference as to rotate the first cam member and the second cam member in opposite directions. Therefore, thrust is produced according to the torque difference that occurs. During operation of the cam mechanism 3, the rotary disc 10, which is the first cam member, and the armature 8 and the movable cam member 9, which are the second cam members, rotate differently from each other, so that torque cam reaction force is produced. Concretely, due to the differential rotation, the cam balls 11 move onto the cam surfaces 9a and 10a, and therefore torque cam reaction force occurs in such a direction as to press the movable cam member 9 and the rotary disc 10 and move them away from each other. If the torque cam reaction force on the movable cam member 9 surpasses the elastic force exerted thereon by the second return spring 4b, the movable cam member 9 moves in the axis direction to the yoke 7 side, against the elastic force of the second return spring 4b. If the friction force between the armature 8 and the yoke 7 increases and therefore the differential rotation increases, the friction torque from the armature 8 is input to the movable cam member 9, so that the torque cam reaction force increases. Thus, the torque cam reaction force is produced by the differential rotation in the cam mechanism 3, that is, produced by the friction torque that results from the friction force produced by friction engagement. The torque cam reaction force acts as thrust that moves the movable cam member in the axis direction, during the transition from the first engaged state to the second engaged state exemplified in FIG. 3.

When receiving the torque cam reaction force, the movable cam member 9 is moved in the axis direction to the yoke 7 side to contact the armature 8, which has been in friction engagement with the yoke 7. Therefore, the pressing surface 8a of the armature 8 and the pressing surface 9a of the movable cam member 9, which have been apart from each other, come into contact with each other. This state, as exemplified in FIG. 3, in which the friction surface 7a of the yoke 7 and the friction surface 8a of the armature 8 are in contact with each other, and the pressed surface 8b of the armature 8 and the pressing surface 9b of the movable cam member 9 are in contact with each other. This state is termed the second engaged state. The second engaged state is a state in which the armature 8 and the yoke 7e are in friction engagement with each other and the movable cam member 9, which receives the torque cam reaction force, is pressing the yoke 7 and is engaged with it via the armature 8. Thus, the movable cam member 9 is pressing the yoke 7 and the armature 8 and is engaged with them due to torque cam reaction force, and the second engaged state is maintained as long as the torque cam reaction force is stronger than the resultant force of the elastic force of the second return spring 4b and a force obtained by subtracting the magnetic attraction force from the elastic force of the first return spring 4a. If this resultant force or the elastic force of the second return spring 4b surpasses the torque cam reaction force, the second engaged state ceases, and changes into the first engaged state or the released state.

For example, during an initial period of the engagement in the second engaged state, the armature 8 is frictionally engaged with the yoke 7 by the electromagnetic attraction force caused by the magnetic flux produced by electric energization of the electromagnetic coil 6, and the movable cam member 9 does not receive, via the armature 8, the force obtained by subtracting the magnetic attraction force from the elastic force of the first return spring 4a. Therefore, the movable cam member 9 remains in the second engaged state as long as the torque cam reaction force is stronger than the elastic force of the second return spring 4b. On another hand, if the current having been passed through the electromagnetic coil 6 is stopped and the electromagnetic attraction force having attracted the armature 8 in contact with the yoke 7 disappears, the movable cam member 9 is urged in such a direction as to move away from the yoke 7, by the elastic force of the first return spring 4a via the armature 8. In this case, as long as the torque cam reaction force is stronger than the resultant force of the elastic forces of the return springs 4, the movable cam member 9 continues to press the yoke 7 so that the second engaged state is maintained. Incidentally, whether the magnetic attraction force disappears instantly or slowly when the current having been passed through the electromagnetic coil is stopped is determined by the magnetic characteristics of the ferromagnetic materials that form the yoke 7 and the armature 8.

Besides, during an initial period of the engagement in the second engaged state, that is, when the contact is made, an engaged state in which the yoke 7 stops the rotation of the movable cam member 9 is not instantaneously reached, but the armature 8 rotates relative to the yoke 7 and has a sliding contact therewith. During a period during which the yoke 7 and the armature 8 that is rotating are in friction engagement as well as during the initial period of the engagement, friction force is produced by the friction surface 8a of the armature 8 and the friction surface 7a of the yoke 7, which causes production of friction torque.

This friction torque is a brake torque that provides the armature 8 with braking force and that therefore provides the rotation shaft 5 with braking force. The friction torque during the second engaged state is termed the brake torque Tb2. The brake torque Tb2 is expressed by a relation of "Tb2=μ×r× (Fm+Fc)" where Fm is the magnetic attraction force, Fc is the torque cam reaction force, μ is the friction coefficient of the friction surfaces, and r is the friction radius. Therefore, if the total engagement force (Fm+Fc) obtained by summing the torque cam reaction force Fc and the magnetic attractive force Fm during the initial period of the engagement in the second engaged state is increased, the torque capacity of the brake torque Tb2 increases. Therefore, even in the case where the magnetic attraction force Fm decreases, the torque capacity increases if the torque cam reaction force increases so that the engagement force relatively increases. The torque cam reaction force acts as engagement force that engages the second cam member with the yoke 7 as long as the second engaged state is maintained. Besides, the torque cam reaction force during the second engaged state increases with increases in the friction torque.

Here, the engaged states in the case where the parameters of the cam mechanism 3 are set for the non-establishment-of-lock condition and the case where the parameters are set for the lock establishment condition will be described. In the case where the parameters of the cam mechanism 3 are set for the non-establishment-of-lock condition, the electromagnetic engagement apparatus 1 has a non-self-lock function of preventing establishment of a self-binding lock state. On the other hand, in the case where the parameters are set for the lock establishment condition, the electromagnetic engagement apparatus 1 has a self-lock function of establishing the self-binding lock state.

Figure 5A:
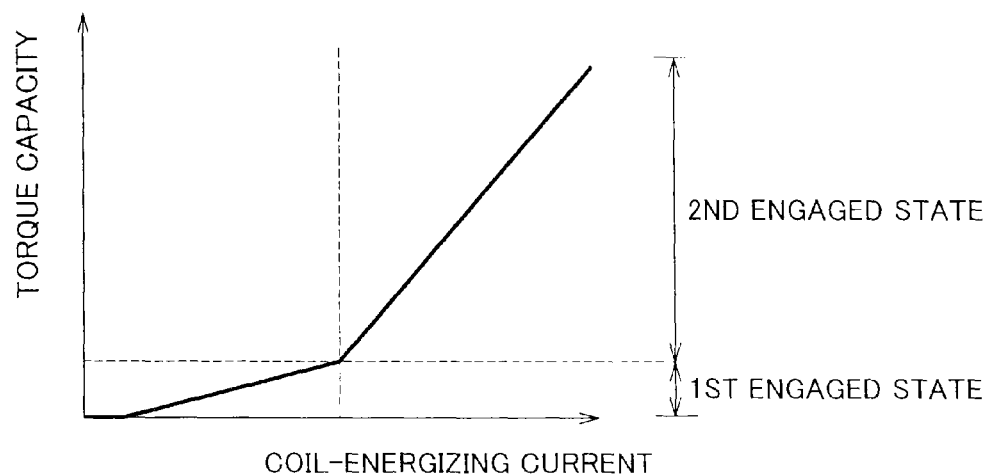
FIG. 5A is a diagram showing a relation between the electric current and the torque capacity in a non-self-lock structure.

In the case where the electromagnetic engagement apparatus 1 has the non-self-lock function, the second engaged state cannot be maintained unless current continues to be passed through the electromagnetic coil 6, that is, unless the armature 8 is attracted in contact with the yoke 7 by magnetic attraction force. In other words, if the torque cam reaction force of the cam mechanism 3 is stronger than the elastic force of the second return spring 4b, the electromagnetic engagement apparatus 1 can maintain the second engaged state, so that it is able to control the torque capacity by the energizing current supplied to the actuator 2 both during the first engaged state and during the second engaged state. FIG. 5A is a diagram showing a relation between the electric current and the torque capacity in a non-self-lock structure, that is, a structure that allows a torque control by electric current. As exemplified in FIG. 5A, the torque capacity increases in proportion to increases in the energizing current both during the first engaged state and during the second engaged state. The slope that indicates increase in the torque capacity is proportional to the engagement force occurring during the engaged state, and the engagement force during the first engaged state is based on the magnetic attraction force, and the engagement force during the second engaged state is based on the magnetic attraction force and the torque cam reaction force. Therefore, since the magnetic attraction force increases with increases in the amount of energizing current through the electromagnetic coil and the engagement force during the second engaged state includes the torque cam reaction force added, the slope during the second engaged state is greater than the slope during the first engaged state.

Figure 5B:
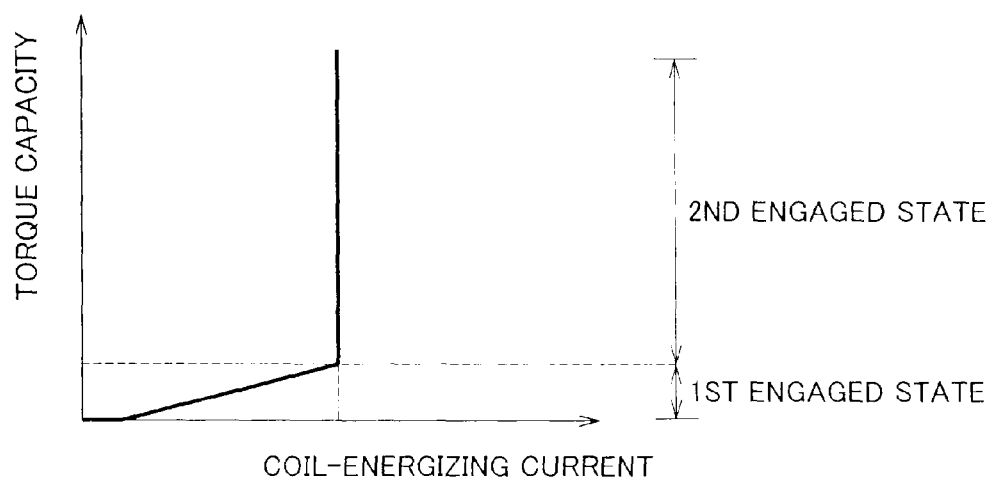
FIG. 5B is a diagram showing a relation between the electric current and the torque capacity in a self-lock structure.

On the other hand, in the case where the electromagnetic engagement apparatus 1 has the self-lock function, even if during the second engaged state, the current having been passed through the electromagnetic coil 6 is stopped, that is, the magnetic attraction force disappears, the second engaged state can be maintained. Therefore, during the second engaged state, the torque capacity cannot be controlled by the energizing current supplied to the actuator 2. However, if a self-locked state is reached, a circulation in which the friction force provided by the yoke 7 is increases, and the friction torque resulting from the increased friction force increases, and input by the differential rotation based on the increased friction torque is made so that the torque cam reaction force increases occurs repeatedly or circularly. FIG. 5B is a diagram showing a relation between the electric current and the torque capacity in a self-lock structure. As exemplified in FIG. 5B, the torque capacity increases in proportion to increases in the energizing current during the first engaged state. During the second engaged state, on the other hand, increases in the energizing current does not contribute to increases in the torque capacity. Therefore, in the self-lock structure, the torque control by the energizing current passed in the actuator 2 is possible during the first engaged state. During the second engaged state, since the self-locked state is established and the torque circulation occurs so as to increase the self-binding engagement force, the torque capacity can be increased independently of the energizing current. Incidentally, the self-lock function is to increase the engagement force that unites the components of the cam mechanism 3 together.

The electromagnetic engagement apparatus 1 is an apparatus in which the torque cam reaction force is produced by differential rotation in the cam mechanism 3. For example, even during the released state as exemplified in FIG. 1, torque cam reaction force is produced if there occurs differential rotation between the first cam member and the second cam member. However, in the electromagnetic engagement apparatus 1, in order to prevent an intended locked state (erroneous locking) from being caused by operation of the cam mechanism 3, a predetermined lock establishment condition is set and the elastic force of the second return spring 4b is enhanced. For example, examples of the lock establishment condition for causing the self-locked state and preventing the erroneous locking include a condition that the cam angle be set at a proper angle, a condition that a cam friction coefficient that contributes to the friction force between the cam surfaces 9a and 10a and the cam balls 11 be set at a proper predetermined value, a condition that the cam balls 11 be disposed so that the disposal diameter thereof is a proper value, etc. If the predetermined lock establishment condition is set, the cam mechanism 3 performs the self-lock function, and prevents erroneous locking. Besides, a case where the armature 8 is moved to the yoke 7 side by input of vibration to the armature 8 is conceivable. For risk reduction in this case, the armature 7 may be constructed so as to have a reduced weight. Furthermore, if the movable cam member 9 is kept at the position of the released state and only the armature 8 collides with the yoke 7 due to vibration, the torque capacity can be limited only to a very short time of the collision.

Besides, in the electromagnetic engagement apparatus 1, if the elastic force of the return spring surpasses the engagement force during the engaged state, the engaged state ceases, and changes into the released state For example, if during the first engaged state, the elastic force of the first return spring 4a surpasses the magnetic attraction force, the armature 8 is moved in the direction away from the yoke 7, and the first engaged state ceases, and changes into the released state. Besides, if during the second engaged state of the cam mechanism 3 of the non-self-lock structure, the current being passed through the electromagnetic coil 6 is stopped and therefore the magnetic attraction force disappears, so that the elastic force of the second return spring 4b surpasses the engagement force, the movable cam member 9 is moved in the direction away from the yoke 7 by the second return spring 4b, so that the second engaged state ceases, and changes into the released state. Furthermore, if during the second engaged state of the cam mechanism 3 of the self-lock structure, the resultant force of the elastic forces of the first return spring 4a and the second return spring 4b surpasses the torque cam reaction force, the armature 8 and the movable cam member 9 are moved by the first return spring 4a and by the second return spring 4b, respectively, in the direction away from the yoke 7, so that the second engaged state ceases, and changes into the released state.

Figure 6:
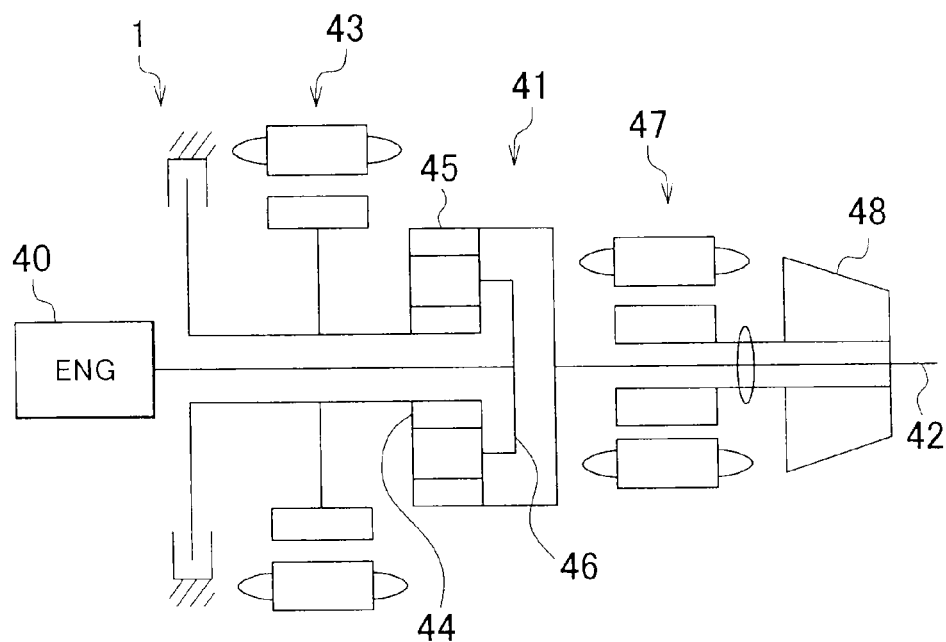
FIG. 6 is a skeleton diagram schematically showing an example of a hybrid drive apparatus equipped with an electromagnetic engagement apparatus in accordance with the foregoing embodiment of the invention.

Next, operations of a hybrid vehicle in which an electromagnetic engagement apparatus in accordance with the invention is mounted will be described with reference to FIG. 6. FIG. 6 is a skeleton diagram schematically showing an example of a gear train of a hybrid vehicle in which the electromagnetic engagement apparatus 1 of the embodiment is mounted. The example shown in FIG. 6 is a so-called two-motor-type hybrid drive apparatus that is constructed so that the motive power that the engine 40 outputs is divided by a power splitting mechanism 41 to an output shaft 42 side and a first motor-generator 43 side. The engine 40 is an internal combustion mechanism, such as a gasoline engine, a diesel engine, etc., whose output elements, such as the crankshaft and the like, are linked to the power splitting mechanism 41. The power splitting mechanism 41, in the example shown in FIG. 6, is constructed of a single-pinion-side planetary gear mechanism in which a sun gear 44 and a ring gear 45 are concentrically disposed, and pinions that mesh with the sun gear 44 and the ring gear 45 are held by a carrier 46 so as to be able to rotate about their own axes and revolve about a center axis of the sun gear 44 and the ring gear 45. The engine 40 is linked to the carrier 46, and therefore the carrier 46 is an input element. Besides, a first motor-generator 43 is linked to the sun gear 44, and therefore the sun gear 44 is a reaction element. Furthermore, the ring gear 45 is linked to an output shaft 42, and therefore the ring gear 45 is an output element.

Besides, a second motor-generator 47 is linked to the output shaft 42 via a speed change portion 48. The speed change portion 48 is constructed of a speed change mechanism that transmits torque from the second motor-generator 47 to the output shaft 42 while increasing or decreasing the torque. The speed change ratio of the speed change portion 48 may be set to one predetermined value, or a construction may be provided such that the speed change ratio can be changed from one to another of a plurality of values.

Each one of the motor-generators 43 and 47 is constructed of, for example, a permanent magnet type synchronous electric motor, so as to function as a motor to output torque when coils are electrically energized, and so as to function as an electricity generator to generate electric power when a rotor is forced to rotate by external force. A construction is made such that each of the motor-generators 43 and 47 is electrically connected to an electricity storage device such as a battery or the like via an inverter (not shown), and electric power generated by one of the motor-generators can be supplied to the other motor-generator. Then, an electronic control unit (not shown) constructed mainly of a microprocessor is connected to the inverter. The electronic control unit controls the rotation speed, the torque and the amount of electricity generation of each of the motor-generators 43 and 47 Incidentally, the engine 40 is constructed so that the intake air amount, the amount of supply of fuel, the ignition timing, etc. are electrically controlled, and accordingly the torque and the rotation speed of the engine 40 are electrically controlled.

In a so-called normal hybrid mode in which the motive power that the engine 40 outputs is divided to the output shaft 42 side and to the first motor-generator 43 side, the first motor-generator 43 is caused to function as an electricity generator, so that the torque involved with the electricity generation acts on the sun gear 44 as so-called reaction torque. Therefore, torque amplified from the engine torque occurs on the ring gear 45, which is the output element. Besides, the electric power generated by the first motor-generator 43 is used to cause the second motor-generator 47 to function as a motor, and the output torque of the second motor-generator 47 is transmitted to the output shaft 42 via the speed change portion 48. That is, a part of the motive power that the engine 40 outputs is transmitted to the output shaft 42 via the power splitting mechanism 41, and the other part of the motive power is converted into electric power, which is then converted to mechanical power that is then transmitted to the output shaft 42.

If the engine load gradually decreases, the rotation speed of the sun gear 44, that is, of the first motor-generator 43, is lowered. This is a result of controlling the rotation speed of the engine 40 to a rotation speed that achieves good fuel economy. Eventually, a traveling state in which the rotation speed of the sun gear 44 is zero is reached. In that case, instead of the first motor-generator 43 being used to produce reaction torque, the electromagnetic engagement apparatus 1 is engaged so as to produce reaction torque that fixes the sun gear 44, that is, prevents the sun gear 44 from rotating. This eliminates the need to control the torque of the first motor-generator 43, so that energy loss can be restrained.

If the vehicle speed of the vehicle equipped with the hybrid drive apparatus further increases and the engine load is relatively small, the first motor-generator 43 is caused to function as a motor so as to rotate the sun gear 44 in the direction opposite to the rotation direction of the engine 40. In this case, the second motor-generator 47 is caused to function as an electricity generator to perform energy regeneration (energy recovery), and the electric power generated thereby is supplied to the first motor-generator 43.

Figure 7:
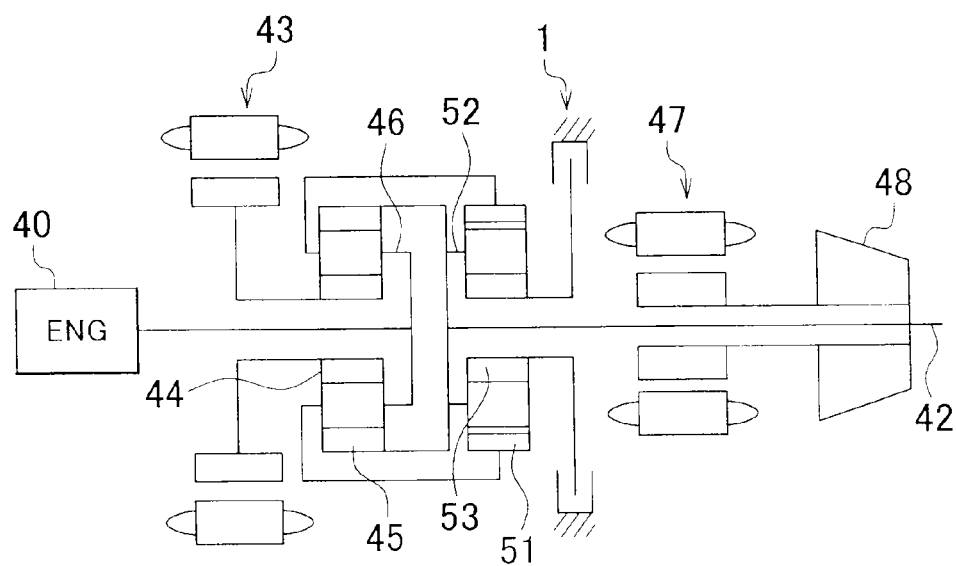
FIG. 7 is a skeleton diagram schematically showing another example of a hybrid drive apparatus equipped with an electromagnetic engagement apparatus in accordance with the foregoing embodiment of the invention.

When the electromagnetic engagement apparatus 1 in accordance with the invention is used as a brake in a hybrid drive apparatus, the hybrid drive apparatus is not limited to the hybrid drive apparatus constructed as described above with reference to FIG. 6. For example, the electromagnetic engagement apparatus 1 may also be used in a hybrid drive apparatus that is constructed as shown in FIG. 7. In the example shown in FIG. 7, a power splitting mechanism 41 is constructed of a so-called combined type planetary gear mechanism made up of a single-pinion type planetary gear mechanism and a double-pinion type planetary gear mechanism. A carrier 46 of the single-pinion-side planetary gear mechanism to which the engine 40 is linked is linked to a ring gear 51 of the double-pinion type planetary gear mechanism, and a ring gear 45 of the single-pinion type planetary gear mechanism which is linked to an output shaft 42 is linked to a carrier 52 of the double-pinion type planetary gear mechanism. A sun gear 53 of the double-pinion type planetary gear mechanism is linked to the electromagnetic engagement apparatus 1. Other constructions and components of the example shown in FIG. 7 are substantially the same as those exemplified in FIG. 6, are denoted in FIG. 7 by the same reference characters as those in FIG. 6.

In the hybrid drive apparatus constructed as described above, too, by engaging the electromagnetic engagement apparatus 1, the electromagnetic engagement apparatus 1 is caused to bear the torque that is otherwise borne by the first motor-generator 43, so that the electric energization of the first motor-generator 43 or the electricity generation by the first motor-generator 43 can be stopped.

Figure 8:
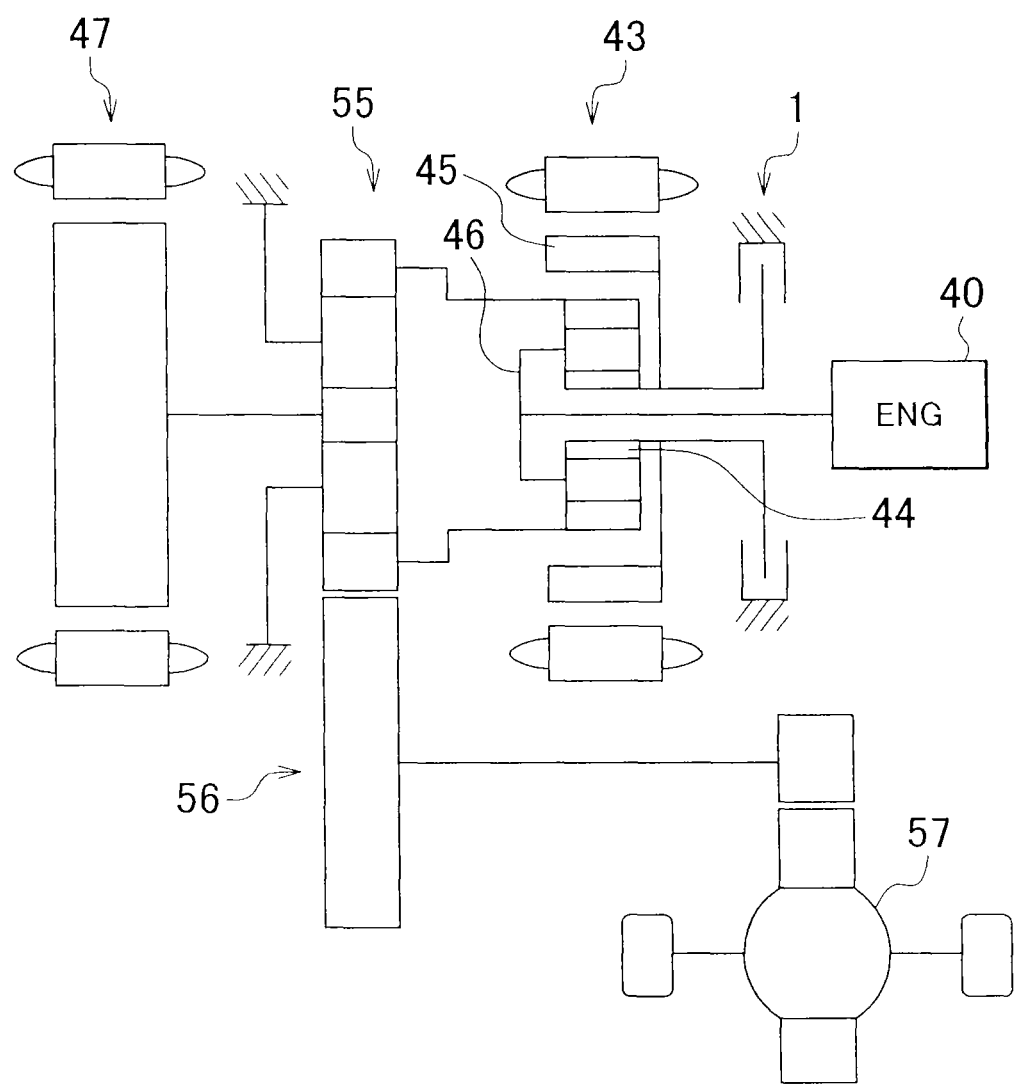
FIG. 8 is a skeleton diagram schematically showing still another example of a hybrid drive apparatus equipped with an electromagnetic engagement apparatus in accordance with the foregoing embodiment of the invention.

In an example shown in FIG. 8, the arrangement of component elements of the hybrid drive apparatus shown in FIG. 7 has been changed so as to be suitable for a front-engine front-wheel drive vehicle. Since component elements in the example shown in FIG. 8 are substantially the same as those shown in FIG. 6, they are denoted by the same reference characters, and descriptions thereof are omitted below. In the example shown in FIG. 8, the speed change portion 48 is constructed of a single-pinion type planetary gear mechanism 55 in which the carrier is fixed. Besides, a counter gear pair 56 is provided instead of the output shaft 42. Via the counter gear pair 56, motive power is output to a front differential 57.

The electromagnetic engagement apparatus in accordance with the invention is not limited to the foregoing embodiments, but may also be an electromagnetic engagement apparatus that is used as a clutch instead of a brake, and can also be applied to a driving apparatus other than the above-described hybrid drive apparatuses. Besides, it should be apparent that the invention is not limited to the electromagnetic engagement apparatus 1, which is merely an embodiment, and that other embodiments may be applied.

For example, although in the foregoing embodiments, the yoke 7 is fixed to the fixture portion and braking force is given to the rotation shaft 5, it is also permissible to adopt a construction in which the yoke 7 receives torque transmitted by the rotation shaft 5, and transmits torque to another component member of the power transmission system.

Although what the electromagnetic coil 6 produces when electrically energized is described above as magnetic flux, this is merely matter of expression, and does not limit the invention. For example, what the electromagnetic coil 6 produces when electrically energized may also be what is expressed as magnetic lines of force, magnetic field, etc. Therefore, the flow of magnetic flux in the foregoing description may also be what is expressed as a magnetic circuit, a magnetic path, etc.

Besides, in the electromagnetic engagement apparatus 1 of the embodiment described above, the second cam member is divided into the first movable cam member and the second movable cam member, and the first movable cam member is formed by the movable cam member 9, and the second movable cam member is formed by the actuator (miniature 8). This is an example of expressions for describing the invention. Therefore, it is also permissible to adopt a construction in which the second cam member is a united set of component members, and the second cam member is provided as a movable cam portion to which the armature that forms a portion of the actuator is linked so as to be relatively movable in the axis direction and rotate integrally together with the movable cam portion. That is, whether to consider the armature as a member that constitutes the actuator or as a member that constitutes the cam mechanism merely makes a difference in expression, and the constructions described by such different expressions are included in the invention.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An electromagnetic engagement apparatus comprising:
   a cam mechanism that has a pair of cam members disposed facing each other in an axis direction, and that produces a thrust in the axis direction according to a torque difference between the cam members if the torque difference occurs so as to rotate the cam members in directions opposite to each other;
   an attracted member that is attached to one cam member of the cam members so as to rotate integrally together with the one cam member and be relatively movable in the axis direction;
   an attracting member that creates the torque difference by a friction force that is produced by attracting at least one of the cam members, including the one of the cam members having the attracted member attached thereto, into contact with the attracting member by a magnetic attraction force, wherein the attracted member is attracted by the attracting member into contact with the attracting member so that the friction force is produced;
   a first return spring that exerts an elastic force on the attracted member in such a direction as to move the attracted member away from the attracting member against the magnetic attractive force; and a second return spring that exerts an elastic force on the one cam member in such a direction as to move the one cam member away from the attracting member against the thrust, wherein the electromagnetic engagement apparatus is configured to increase an engagement force that unites the cam members together by increasing the torque difference by using the thrust that presses the one cam member to an attracting member side, wherein the elastic force of the second return spring is greater than the elastic force of the first return spring.

2. The electromagnetic engagement apparatus according to 1, wherein the attracting member includes a yoke and an electromagnetic coil disposed within the yoke.

3. The electromagnetic engagement apparatus according to 1, wherein a plurality of dimensions and specifications of the electromagnetic engagement apparatus are set such as to allow establishment of a first engaged state in which the attracting member and the attracted member are frictionally engaged with each other but the cam member having the attracted member attached thereto and the attracting member are not engaged with each other, a second engaged state in which the attracting member and the attracted member are frictionally engaged with each other and the attracted member and the one cam member contact and are engaged with each other, and a non-engaged state in which the attracting member is neither engaged with the attracted member nor the one cam member.

4. The electromagnetic engagement apparatus according to 2, wherein an electric current that is passed through the electromagnetic coil is controlled so as to control a torque until the one cam member is engaged, and at least one of cam angles of either of the two cam members, a friction coefficient of each of cam surfaces of either of the two cam members, and a diameter of disposal of a rolling body interposed between the two cam members are set such that the cam mechanism enters a self-locked state when the one cam member is engaged.

5. An electromagnetic engagement apparatus comprising:

a cam mechanism that has a pair of cam members disposed facing each other in an axis direction, and that produces a thrust in the axis direction according to a torque difference between the cam members if the torque difference occurs so as to rotate the cam members in directions opposite to each other;

an attracted member that is attached to one cam member of the cam members so as to rotate integrally together with the one cam member and be relatively movable in the axis direction;

an attracting member that creates the torque difference by a friction force that is produced by attracting at least one of the cam members, including the one of the cam members having the attracted member attached thereto, into contact with the attracting member by a magnetic attraction force, wherein the attracted member is attracted by the attracting member into contact with the attracting member so that the friction force is produced;

a first return spring that exerts an elastic force on the attracted member in such a direction as to move the attracted member away from the attracting member against the magnetic attractive force; and a second return spring that exerts an elastic force on the one cam member in such a direction as to move the one cam member away from the attracting member against the thrust, wherein the electromagnetic engagement apparatus is configured to increase an engagement force that unites the cam members together by increasing the torque difference by using the thrust that presses the one cam member to an attracting member side, wherein the attracted member is disposed between the cam member and the attracting member, and is configured so that due to the thrust, the one cam member clamps the attracted member by working together with the attracting member.

* * * * *